United States Patent [19]

Shinjo

[11] 4,162,724
[45] Jul. 31, 1979

[54] COMPONENT CONVEYING ARRANGEMENT

[75] Inventor: Katsumi Shinjo, Osaka, Japan

[73] Assignee: Yugenkaisha Shinjo Seikakusho, Osaka, Japan

[21] Appl. No.: 859,592

[22] Filed: Dec. 12, 1977

[30] Foreign Application Priority Data

Dec. 11, 1976 [JP] Japan .............................. 51-166294[U]

[51] Int. Cl.² ............................................ B65G 25/10
[52] U.S. Cl. .................................... 198/534; 198/746; 198/747
[58] Field of Search .............. 198/534, 562, 563, 485, 198/746, 747; 221/268; 193/25 AC, 25 C, 25 FT, 38

[56] References Cited

U.S. PATENT DOCUMENTS

| 3,137,485 | 6/1964 | Johnson et al. | 198/746 |
| 3,346,096 | 10/1967 | Johnson | 198/746 |
| 3,872,962 | 3/1975 | de Light | 198/485 |

Primary Examiner—Robert B. Reeves
Assistant Examiner—Jeffrey V. Nase
Attorney, Agent, or Firm—Craig and Antonelli

[57] ABSTRACT

A conveyor arrangement for carrying a continuous row of component parts from a container or supply to an automatic assembling machine. A feeder chute is provided for feeding the component parts to a guide or feeder track which is operatively connected with a supply chute or hose connected to the assembling machine. A device is provided for maintaining the component parts in the guide or feeder track and an advancing mechanism is provided for advancing the component parts from an end of the guide track to an entrance of the supply chute or hose. Pawls are provided at the advancing mechanism and the supply chute for facilitating the advancement of the component parts and preventing return of advanced component parts from the supply chute or hose to the guide track.

22 Claims, 4 Drawing Figures

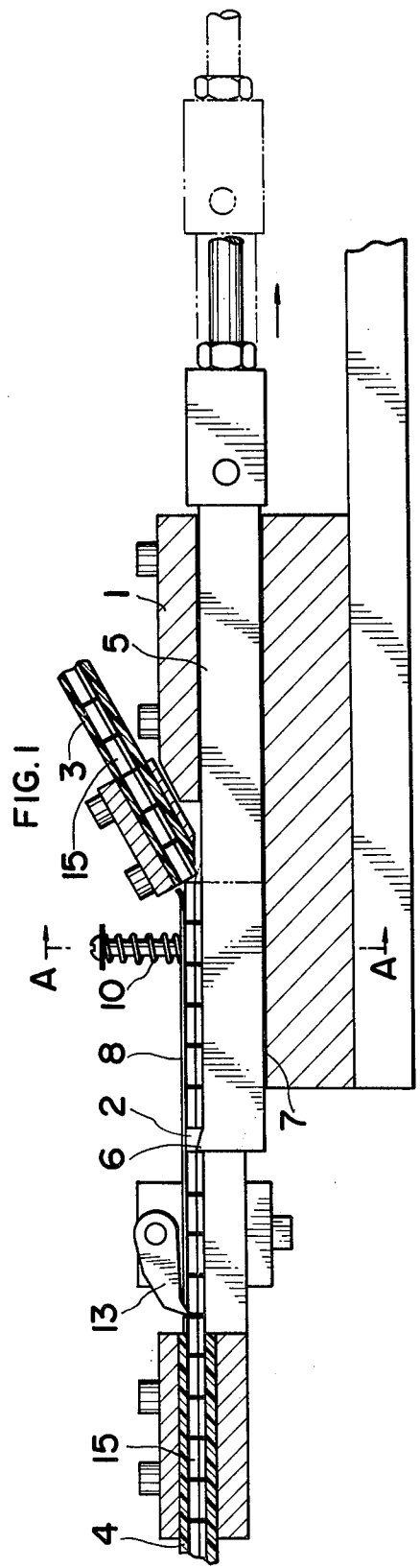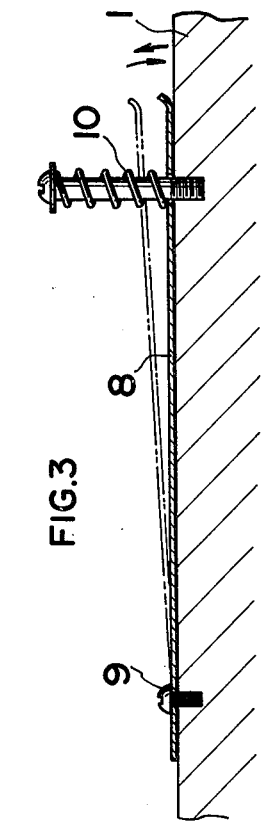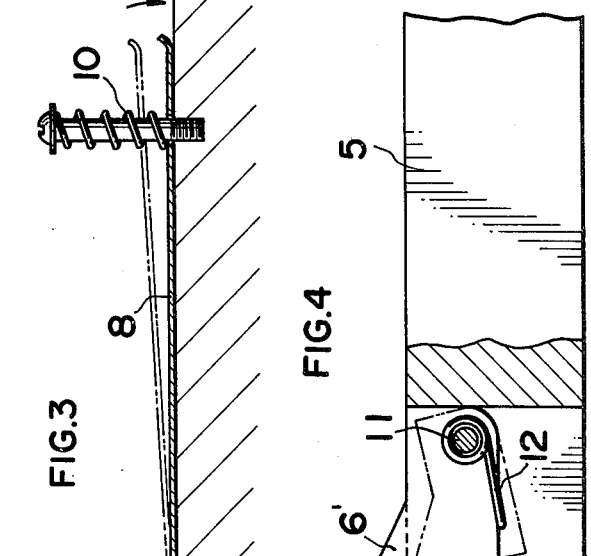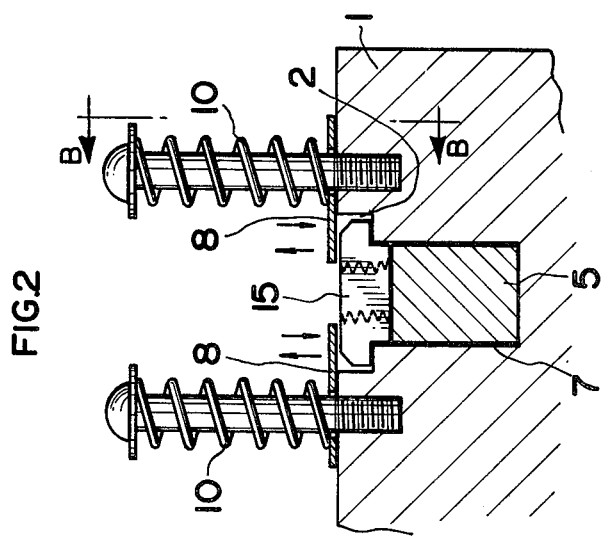

COMPONENT CONVEYING ARRANGEMENT

The present invention relates to a conveyor arrangement and, more particularly, to a conveying arrangement for conveying or carrying a continuous row of component parts from a source or container to an automatic assembling machine.

To convey rows of small component parts such as, for example, self-piercing nuts, it has been proposed to utilize a supply hose or chute to automatically transport or convey the individual component parts from a conveyor to an automatic assembling machine. By virtue of practical operating and manufacturing conditions, it is often necessary to convey or transport the continuous rows of component parts over a long distance from the container or source to the assembling machine. To minimize the space requirements of the conveying apparatus and the assembling machine, the supply chute or hose is normally curved in one or more sections.

One disadvantage of the proposed solutions utilizing curved supply chutes or hoses resides in the fact that the component parts do not advance smoothly in the curved section or sections. The failure to provide for a smooth advancement of the component parts in turn leads to jamming of the component parts in the curved section or sections, thereby necessitating a shut-down of either the entire assembling operation and/or the component parts supply operation. The shut-down of the entire assembling or supply operation results in inefficient operation of the assembling machine and causes an increase in the overall operational expenses.

The aim underlying the present invention essentially resides in providing an improved conveyor arrangement for small component parts, which conveyor arrangement includes a feeding path which is vertically curved and/or raised.

According to one feature of the present invention, an inclined feeder chute is provided for feeding the component parts, by gravity, to a guide or feeder track arranged at a support body with the guide or feeder track extending linearly of the support body from the end of the feeder chute to a supply chute or hose. A component part advancing mechanism is arranged at the guide or feeder track for advancing the component parts from an end of the guide or feeder track to an entrance of the supply chute or hose.

According to another advantageous feature of the present invention, means are provided for maintaining the component parts in the guide or feeder track so as to prevent the individual component parts from being displaced from the guide or feeder track, thereby leading to a jamming of the individual parts in the guide or feeder track. For this purpose, thin plate elements such as, for example, leaf spring elements or the like, are arranged on each side of the guide track with portions of each of the elements overlying the guide track so as to prevent the component parts from being pushed therefrom. Spring means are provided for permitting the plate elements to flap within predetermined limits.

In accordance with a further feature of the present invention, the component part advancing mechanism effects a positive advancement of the component parts from the guide or feeder track to the supply chute or hose. For this purpose, a pneumatic piston-cylinder unit is provided to which is attached a pusher or advancing element accommodated in a groove or recess in the support body beneath the guide or feeder track. The piston-cylinder unit is selectively activated so as to cause reciprocating movement of the pusher or advancing element in the groove or recess, thereby causing advancement of the component parts from the guide or feeder track to the supply chute or hose.

In accordance with yet another feature of the present invention, a stationary upwardly directed pawl is provided at a free end of the pusher or advancing element. The tip of the pawl is adapted to be inserted between adjacent components in a row of components such that an end surface of the pawl engages a surface of a forward component to cause an advancement thereof upon the pusher or advancing element being displaced in a forward direction by the piston-cylinder unit.

According to the present invention, the pawl may be rotatably mounted at the free end of the pusher or advancing element with a spring being provided for normally biasing the pawl in an upward direction. Upon the pusher or advancing element being withdrawn, the rotary pawl engages a component part such that the pawl is displaced against the bias of the spring with the spring then urging the pawl between adjacent component parts.

In accordance with an additional feature of the present invention, means are provided for preventing the advanced components in the supply hose or chute from being returned by gravity. For this purpose, a spring biased, non-return check pawl is arranged in the area of the entrance of the supply chute or hose, which check pawl maintains the advanced component parts in the supply chute or hose.

Accordingly, it is an object of the present invention to provide a conveyor arrangement for component parts which avoids by simple means the shortcomings and disadvantages encountered in the prior art.

Another object of the present invention resides in providing a conveyor arrangement for component parts which ensures a smooth flow of component parts through the supply chute or hose in order to effect an automatic assembling operation.

A further object of the present invention resides in providing a conveyor arrangement for component parts which feeds the component parts through a raised and/or curved feeding path.

An additional object of the present invention resides in providing a conveyor arrangement for component parts which minimizes, if not avoids, any jamming of the component parts in the feed, guide and/or supply paths.

Yet another object of the present invention resides in providing a conveyor arrangement for component parts which minimizes, if not avoids, any down-time of the assembling and/or supplying mechanisms.

A still further object of the present invention resides in providing a conveyor arrangement for component parts which functions reliably under all operating conditions.

Still another object of the present invention resides in providing a conveyor arrangement which is simple in construction and, therefore, inexpensive to manufacture.

These and other objects, features and advantages of the present invention will become more apparent from the following description when taken in connection with the accompanying drawings which show, for the purposes of illustration only, several embodiments in accordance with the present invention, and wherein:

FIG. 1 is a vertical cross-sectional view of a conveyor arrangement in accordance with the present invention;

FIG. 2 is a vertical cross-sectional view, on an enlarged scale, taken along the line A—A in FIG. 1;

FIG. 3 is a vertical cross-sectional view taken along the line B—B of FIG. 2; and FIG. 4 is a partly broken side view of a modified component advancing mechanism in accordance with the present invention.

Referring now to the drawings wherein like reference numerals are used throughout the various views to designate like parts and, more particularly, to FIG. 1, according to this figure, a body or support structure 1 is provided having a feeder or guide track 2 arranged on an upper or top surface thereof. The feeder or guide track 2 is continuous and extends horizontally and linearly along at least a portion of the length of the body or support structure 1. An inclined feeder chute 3 is arranged at one end of the feeder or guide track 2 with a long supply chute or hose 4 being connected to an opposite end of the feeder or guide track 2. The long supply chute or hose 4 extends between the end of the feeder or guide track 2 and an automatic assembling machine (not shown).

The feeder chute 3 feeds a succession of the small component parts 15 by a gravity feed to the feeder or guide track 2 which, in turn, supplies the component parts 15 to the long supply chute or hose 4 and to the assembling machine. The component parts 15 may be, for example, self-piercing nuts used for anchoring metal plates of the type disclosed, for example, in U.S. Pat. Nos. 3,152,628, 3,187,796, 3,704,507 and commonly owned co-pending U.S. patent application Ser. No. 325,049. The self-piercing nuts would be fed by the long chute or hose 4 to an assembling machine of the type disclosed, for example, in U.S. Pat. Nos. 2,652,949 and 2,749,606.

A groove or recess 7 is provided in the body or support structure 1 and extends beneath a bottom of the feeder or guide track 2. A pusher or advancing element 5 is slidably accommodated in the groove or recess 7 and is selectively reciprocated by a suitable drive means such as, for example, a pneumatic piston-cylinder unit (not shown). A pawl 6 having an inclined portion is provided at a forward end of the pusher or advancing element 5 with the pawl 6 projecting upwardly so as to push the component parts 15 forward when the pusher or advancing element 5 is displaced forwardly. When the pusher or advancing element 5 is advanced or displaced forwardly, the component parts 15 are engaged by an end surface of the pawl 6, thereby enabling the component parts 15 to enter supply chute or hose 4.

As shown most clearly in FIG. 2, a pair of prevention or oppressor means 8 are provided at opposite sides of the feeder or guide track 2 to prevent the component parts 15 from leaving the feeder or guide track 2. Each prevention or oppressor means is fixedly secured to the body or support structure 1 by means of a pin 9 (FIG. 3) at an end portion situated adjacently to a terminating end of the feeder or guide track 2, whereas an opposite end portion of the prevention or oppressor means 8 is kept free so as to enable the same to flap. However, as shown most clearly in FIG. 3, the flapping end of the prevention or oppressor means 8 is normally biased in a downward direction by a coil spring 10. The prevention or oppressor means 8 may be constructed of a thin plate material such as, for example, a leaf spring element or the like.

By virtue of the adaptability of the prevention or oppressor means 8 to flap at least one end portion thereof, the component parts 15 positioned at the entrance of the feeder or guide track 2 can be upwardly displaced under an upward biasing given by the withdrawing pawl 6 of the pusher or advancing element 5, thereby enabling the pawl 6 to smoothly pass between adjacent component parts 15.

As shown most clearly in FIG. 4, the end portion of the pusher or advancing element 5 may be provided with a rotatably mounted pawl element 6'. The rotatable pawl element 6' is pivoted about a pin 11 mounted in a top end portion of the pusher or advancing element 5 with a spring 12 normally biasing the rotary pawl element 6' in an upward direction. When the pusher or advancing element 5 is withdrawn by the cylinder-piston unit (not shown), the rotary pawl element 6' is caused to engage a component part 15 such that the rotary pawl element 6' is pushed down against the bias of the spring 12 by the component part 15. The tip of the rotary pawl element 6' engages between adjacent component element such that upon an advancing of the pusher or advancing element 5, the spring 12 biases the tip of the rotary pawl element 6' between the adjacent component parts 15.

To prevent the component parts 15 from coming out of the hose or chute 4 by gravitational forces, an appropriate return check pawl 13 (FIG. 1) is mounted at the entrance of the chute or hose 4. By virtue of the arrangement of the pawl 6 or the rotary pawl 6', check pawl 13 and prevention means 8, the component parts 15 are smoothly transported through the conveyor arrangement to the assembling machine.

While I have shown and described several embodiments in accordance with the present invention, it is understood that the same is not limited thereto, but is susceptible of numerous changes and modifications as known to a person skilled in the art, and I therefor do not wish to be restricted to the details shown and described herein, but intend to cover all such changes and modifications as are encompassed by the scope of the appended claims.

I claim:

1. A conveyor arrangement for conveying small component parts to an automatic assembling machine, the arrangement comprising:
    a support means,
    guide track means,
    guide track means extending along at least a portion of a length of the support means for guiding a movement of the component parts,
    means receiprocably arranged at said support means for advancing said component parts from said guide track means, and
    means for preventing the component parts from leaving said guide track means including a pair of plate elements arranged on respective sides of said guide track means so as to at least partially overlie the same, means for fixing each of said plate elements to said support means so that a first end of each of said plate elements is fixedly mounted at said support means and a second end of each of said plate elements is freely movable within predetermined limits.

2. An arrangement according to claim 1, further comprising means for preventing a return of advanced component parts from a component supply means operatively connected to the automatic assembling machine to the guide track means including a spring biased pawl member arranged at an entrance to the component supply means, said spring biased pawl member being disposed so as to engage an end surface of an advanced component part advanced from said guide track means.

3. An arrangement according to claim 1, wherein said advancing means includes at least one pusher element arranged at said guide track means, and means operatively connected with said pusher element for selectively reciprocating the same.

4. An arrangement according to claim 3, wherein means are provided on said pusher element for engaging a surface of one of the component parts during an advancement of the pusher element.

5. An arrangement according to claim 4, wherein said engaging means includes an upwardly projecting pawl provided at a front end of said pusher element.

6. An arrangement according to claim 5, wherein said upwardly projecting pawl is stationarily formed on said pusher element.

7. An arrangement according to claim 6, further comprising means for preventing a return of advanced component parts from a component supply means operatively connected to the automatic assembling machine to the guide track means including a spring biased pawl member arranged at an entrance to the component supply means, said spring biased pawl member being disposed so as to engage an end surface of an advanced component part advanced from said guide track means.

8. An arrangement according to claim 3, wherein means are provided for normally biasing each of said plate elements in a direction toward said guide track means.

9. An arrangement according to claim 8, wherein said means for normally biasing includes coil spring means arranged at each of said plate elements.

10. An arrangement according to claim 5, wherein means are provided for rotatably mounting said upwardly projecting pawl at a front end of said pusher element.

11. An arrangement according to claim 10, further comprising means for preventing a return of advanced component parts from a component supply means operatively connected to the automatic assembling machine to the guide track means including a spring biased pawl member arranged at an entrance to the component supply means, said spring biased pawl member being disposed so as to engage an end surface of an advanced component part advanced from said guide track means.

12. An arrangement according to claim 11, wherein means are provided for normally biasing each of said plate elements in a direction toward said guide track means.

13. An arrangement according to claim 12, wherein said means for normally biasing includes coil spring means arranged at each of said plate elements.

14. An arrangement according to claim 13, wherein said plate elements are constructed as leaf spring elements.

15. An arrangement according to claim 1, wherein means are provided for normally biasing each of said plate elements in a direction toward said guide track means.

16. An arrangement according to claim 15, wherein said means for normally biasing includes coil spring means arranged at each of said plate elements.

17. An arrangement according to claim 16, wherein said plate elements are constructed as leaf spring elements.

18. An arrangement according to claim 1, further comprising means for feeding component parts to said guide track means.

19. An arrangement according to claim 18, wherein said feeding means is constructed as a chute arranged at an inclination to said guide track means.

20. An arrangement according to claim 18, further comprising means for preventing a return of advanced component parts from a supply means of the assembling machine to the guide track means.

21. An arrangement according to claim 20, wherein the supply means of the assembling machine is constructed as a supply chute.

22. An arrangement according to claim 20, wherein the supply means of the assembling machine is constructed as a hose.

* * * * *